United States Patent
Self et al.

(10) Patent No.: US 8,103,392 B2
(45) Date of Patent: Jan. 24, 2012

(54) DEVELOPMENTS IN OR RELATING TO SYSTEM PROGNOSTICS

(75) Inventors: Kristian A. Self, Bristol (GB); Geoffrey Radmore, Bristol (GB); David Walker, Bristol (GB)

(73) Assignee: Rolls-Royce PLC, London (GB)

( * ) Notice: Subject to any disclaimer, the term of this patent is extended or adjusted under 35 U.S.C. 154(b) by 281 days.

(21) Appl. No.: 12/382,984

(22) Filed: Mar. 27, 2009

(65) Prior Publication Data

US 2009/0281683 A1    Nov. 12, 2009

(30) Foreign Application Priority Data

May 12, 2008    (GB) .................................. 0808469.1

(51) Int. Cl.
*G05B 13/00* (2006.01)
(52) U.S. Cl. .................. 701/3; 701/31; 701/36
(58) Field of Classification Search .............. 701/34, 701/29, 31, 3, 39, 40, 11, 12, 62, 63, 92, 701/97, 98, 106, 107, 36, 1; 714/2, 26; 702/185, 702/35
See application file for complete search history.

(56) References Cited

U.S. PATENT DOCUMENTS

| | | | |
|---|---|---|---|
| 4,644,538 A * | 2/1987 | Cooper et al. ................. 714/10 |
| 5,819,188 A | 10/1998 | Vos | |
| 5,881,971 A * | 3/1999 | Hickman ..................... 244/1 R |
| 5,964,811 A * | 10/1999 | Ishii et al. ...................... 701/29 |
| 6,326,758 B1 * | 12/2001 | Discenzo ..................... 318/609 |
| 6,389,335 B1 * | 5/2002 | Vos .................................. 701/4 |
| 6,526,527 B1 * | 2/2003 | Gall et al. ...................... 714/55 |
| 6,622,972 B2 * | 9/2003 | Urnes et al. ................... 244/194 |
| 6,646,397 B1 * | 11/2003 | Discenzo ................. 318/400.07 |
| 6,735,549 B2 * | 5/2004 | Ridolfo .......................... 702/181 |
| 7,209,814 B2 * | 4/2007 | Kipersztok et al. .............. 701/29 |
| 7,337,086 B2 * | 2/2008 | Guralnik et al. ............... 702/113 |
| 7,538,512 B2 * | 5/2009 | Discenzo ..................... 318/609 |
| 7,877,177 B2 * | 1/2011 | Kueperkoch et al. ........... 701/34 |
| 2003/0216888 A1 | 11/2003 | Ridolfo | |
| 2004/0030524 A1 | 2/2004 | Jarrell et al. | |

FOREIGN PATENT DOCUMENTS

GB    2 403 819 A    1/2005
WO    WO 01/714454 A2    9/2001

OTHER PUBLICATIONS

Luo, Jianhui et al. "Model-Based Prognostic Techniques Applied to a Suspension System." IEEE Transactions on Systems, Man, and Cybernetics. Part A: Systems and Humans, vol. 38, No. 5. Sep. 2008.

* cited by examiner

*Primary Examiner* — Paul N Dickson
*Assistant Examiner* — Keith Frisby
(74) *Attorney, Agent, or Firm* — Oliff & Berridge, PLC

(57) ABSTRACT

A method of mitigating the system-level effect of a fault detected in a vehicle system during a vehicle mission, the method comprising: using a processor to automatically prognose the system-level effect of said fault in terms of the residual capability of the vehicle system during the remainder of the mission, on the basis of predetermined stored data; using a processor to automatically generate a corresponding set of alternative reversionary or investigative action plans for mitigating said system-level effect during the remainder of the vehicle mission, on the basis of said prognosis; submitting the set of alternative reversionary action plans to a decision-making authority for determination by the decision-making authority of a preferred one of the reversionary action plans suitable for achieving a mission objective; and using a control unit, operably connected to the vehicle system, to implement the preferred reversionary action plan in accordance with said determination.

14 Claims, 4 Drawing Sheets

DEVELOPMENTS IN OR RELATING TO SYSTEM PROGNOSTICS

The present invention relates to a system, and in particular it relates to a method of mitigating the system-level effect of a fault in such a system during an operating period.

A vehicle such as an aircraft may conveniently be considered as a large number of separate vehicle systems. Such systems will include all of the 'core' systems of the vehicle such as power systems and navigational systems, as well as application-specific systems, such as weapons systems in the specific case of a military vehicle.

The various systems may conveniently be demarcated at a system-level in terms of their function and as such each system will generally span both hardware elements eg gas turbine components and an Engine Control Unit, as well as software elements eg propulsion management software for execution by the Engine Control Unit to control operation of an associated gas turbine. Certain systems might even include a human pilot as part of the system.

The interrelationship between the various systems can be complex. A given hardware or software component may simultaneously belong to more than one functionally-delimited vehicle system; for example, the aforementioned propulsion management software may form part of both the power system for the aircraft and a control system for the aircraft, which may have additional responsibility for controlling systems other than the power system. The propulsion management software therefore effectively represents a subsystem of both the power system and the control system, with the power system and the control system overlapping at a system-level.

During a vehicle mission, various data is captured concerning the operational status of the vehicle, for example from various sensors and/or diagnostic software etc., and conventionally some of this data may be communicated to the pilot during the course of a mission. One such type of data that is generally communicated to the pilot during a mission is data associated with the detection of a fault occurring in a system of the vehicle. However, such malfunction data is conventionally only diagnostic in nature, providing an indication of the current fault status. Thus, current methods of mitigating the future effects of faults or malfunctions during the remainder of the mission are reliant on the presence of a human pilot, who must evaluate the diagnostic data in the context of what is likely to be a very complicated network of associated vehicle systems and make a reasoned judgement on a suitable course of action to try and mitigate the system-level effect of the fault; the effectiveness of these methods is therefore directly dependent on the judgement and experience of a human pilot, which may vary significantly from one pilot to another.

It is an object of the present invention to seek to provide an improved method for mitigating the effects of faults associated with a system during the course of an operating period for that system, in particular the effects of faults associated with a vehicle system in the course of a mission.

According to the present invention there is provided a method of mitigating the system level effect of a fault detected in a system during an operating period, the method comprising: using a processor to automatically prognose the system-level effect of said fault in terms of the residual capability of the system during the remainder of the operating period, on the basis of predetermined stored data; using a processor to automatically generate a corresponding set of alternative reversionary action plans for mitigating said system-level effect during the remainder of the operating period, on the basis of said prognosis; submitting the set of alternative reversionary action plans to a decision-making authority for determination by the decision-making authority of a preferred one of the reversionary action plans suitable for achieving a mission objective; and using a control unit, operably connected to the system, to implement the preferred reversionary action plan in accordance with said determination.

The decision-making authority may comprise a processor having a predetermined remit of delegated autonomy for determining a preferred reversionary action plan.

The system may comprise one or more subsystems and the system level-effect of the fault is determined as a function of the residual capability of one or more of the subsystems.

The vehicle system may comprise one or more compensatory groups of subsystems and the system-level effect of the fault is determined as a function of the residual capability for each subsystem in said group.

The prognosis of the residual capability of a system or subsystem may include determining a time scale for the severity of the fault to escalate to a threshold severity for that system or subsystem respectively.

The prognosis may further includes estimating the confidence in the determined time-scale.

In a preferred embodiment, the number of alternative reversionary action plans generated is a function of the differential system-level severity with respect to one or more mitigation parameters.

The prognosis of the system-level effect of said fault may comprise implementing a fault detection analysis loop for resolving identification of the fault.

The system may be a vehicle system, in which case the decision-making authority may comprise a pilot of the vehicle, which may be an autopilot. The vehicle itself may, for example, be an aircraft.

Embodiments of the invention will now be described in more detail, by way of example, with reference to the accompanying drawings, in which.

Figure 1:
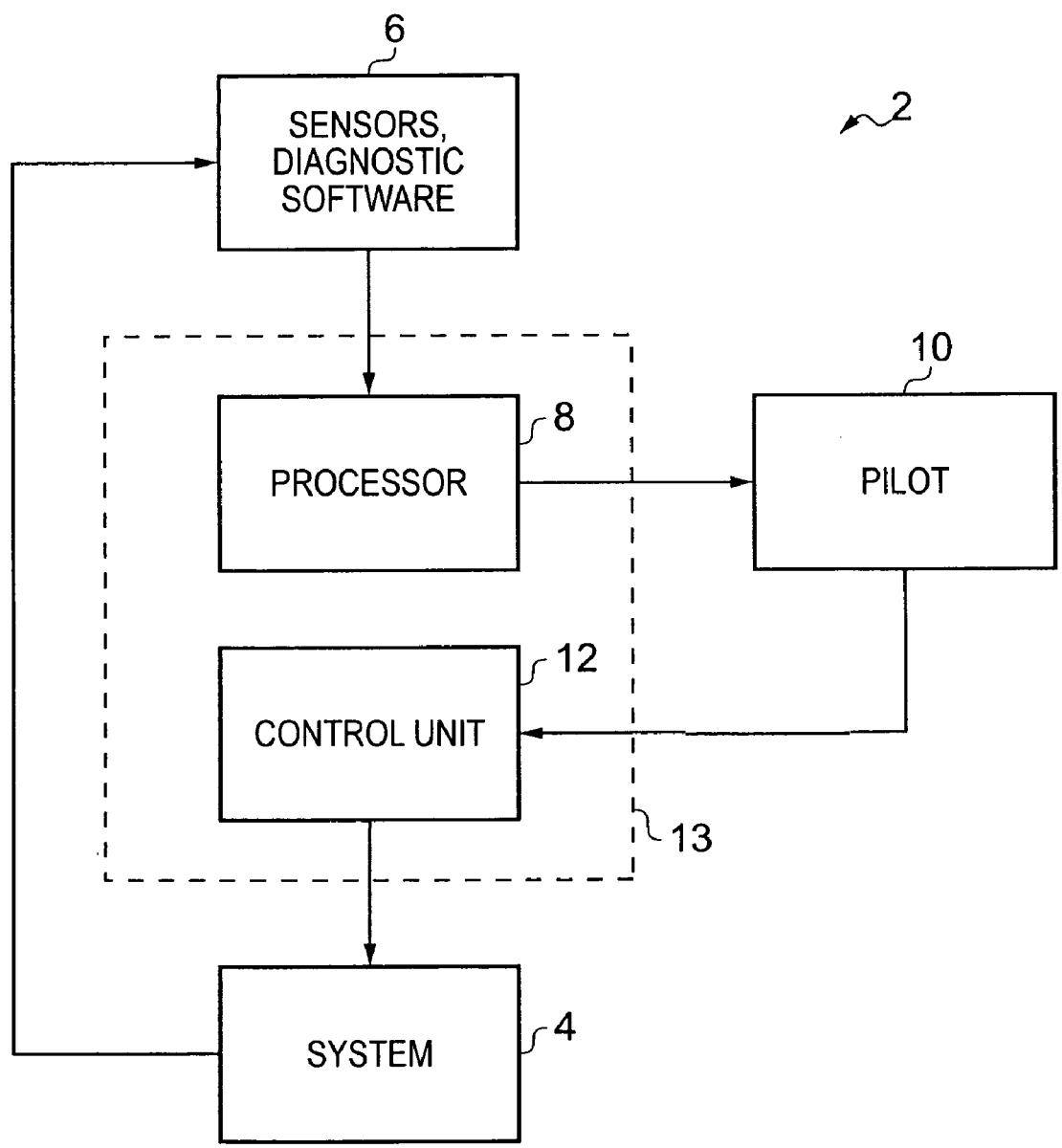
FIG. 1 is a schematic view showing a control system.

FIG. 1 shows an overview of an arrangement 2 for mitigating the system-level effect of a fault detected in a system 4, in this case a vehicle system, by a fault detection means 6 during an operating period, in this case a vehicle mission. In general terms, the vehicle system 4 may be any vehicle system, such as a power system, and the fault-detection means may be any suitable means such as one or more sensors and/or diagnostic software for "detecting" software faults.

The arrangement 2 comprises a processor 8 operably connected to the fault detection means 6, a pilot 10 operably connected to the processor 8 and a control unit 12 operably connected to both the pilot 10 and the vehicle system 4.

The processor 8 and control unit 12 may form part of a larger controller, for example an Engine Control Unit in an aircraft (indicated by the dotted outline 13 in FIG. 1), or may be a respective designated or distributed processing element corresponding to the respective vehicle system 4.

The pilot 10 may be a human pilot, or may alternatively be an "autopilot" in the case of an Unmanned Air Vehicle (UAV), operating under the control of suitable software. By "autopilot" is meant an automatic controller that performs the function of the pilot 10 as set out below.

The arrangement 2 is configured for implementing the decision-loop 14 illustrated generally in FIG. 2 as follows:

At step 16, a fault in the vehicle system 4 is initially detected by the fault detection means 6.

At step 18, the processor 8 automatically carries out a prognosis of the system-level effect of the detected fault in terms of the residual capability of the system 4 during the remainder of the mission.

The prognosis may be carried out under the control of suitable software and is based on predetermined stored data, which may for example be stored in an associated on-board memory (not shown). More specifically, the prognosis may include quantifying the system-level severity of the system 4, selecting one or more suitable mitigation parameters and then determining a time-frame within which the system-level severity will reach a threshold severity as a function of each mitigation parameter.

By way of example, system level severity might be quantified by categorising the severity in one of four levels, which might correspond to very low severity (level 1), low severity (level 2), medium severity (level 3) and high severity (imminent failure of the system). The levels of categorisation may be determined on the basis of prior test or in-service data.

The threshold severity may for example represent a safe-operating threshold or a system-failure threshold.

In general, an appropriate mitigation parameter will be any parameter that may mitigate the system-level effect of the fault and therefore extend the time-frame for transition to a threshold severity for the system.

Both selection of an appropriate mitigation parameter and determination of the relevant time frame as a function of the selected mitigation parameter may be predetermined on the basis of prior test data or experimental data.

In the case of selection of the mitigation parameter, this will in general terms be fault-specific and/or system-specific. For example, in the case where the vehicle system 4 is a power system in an aircraft, it has been found that one such suitable mitigation parameter is the thrust level demand, which may be increased or decreased to vary the time frame for transition to a threshold criticality in the aircraft power system.

In the case of determination of the time frame as a function of the mitigation parameter, this may be achieved using a suitable "look-up" table stored in an on-board memory (not shown).

Once the prognosis has been carried out at step 18, the processor 8 then proceeds to step 20, where the processor automatically generates a corresponding set of alternative reversionary action plans for mitigating the system-level effect of the detected fault during the remainder of the vehicle mission.

In general terms, the set of reversionary action plans will correspond to a respective set of alternative proposals for adjusting the current setting for one or more of the relevant mitigation parameters. For example, in the case of a power system, each reversionary action plan might propose an alternative adjustment to the thrust level demand.

It is envisaged that each reversionary action plan will conveniently include the current system-level criticality, the projected outcome if the setting for the mitigation parameter is not adjusted, the proposed adjustment to the current setting for the mitigation parameter, the projected outcome if the setting is adjusted as proposed and the time frame for reaching the projected outcome in either case.

The number of reversionary action plans generated by the processor 8 may be a function of the rate of change of the system-level severity ie differential severity with respect to one or more mitigation parameters.

Implementation of a preferred one of the reversionary action plans is carried out on the basis of one or more mission objectives.

Figure 2:
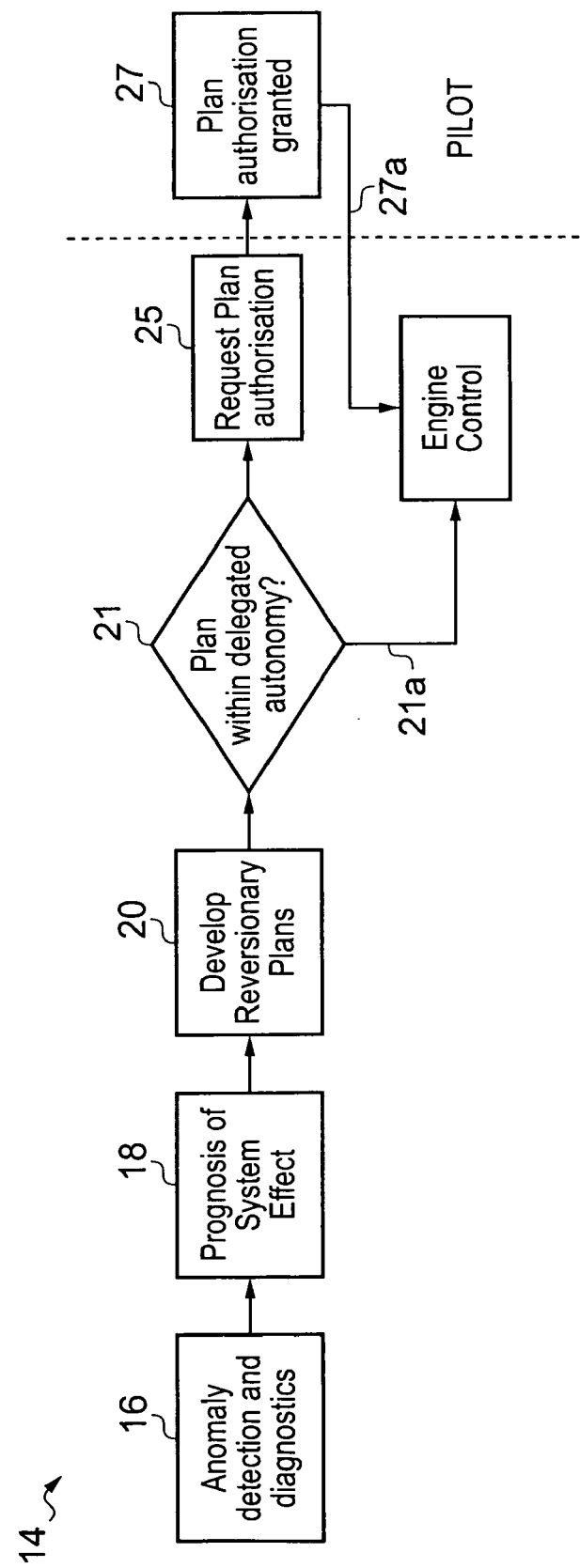
FIG. 2 is a flow diagram showing a decision-loop for implementation by the control system of FIG. 1.

In the embodiment illustrated in FIG. 2, the determination of the preferred reversionary action plan is carried out either by the pilot 10 or, in certain circumstances, autonomously by the processor 8. The processor 8 and pilot 10 may thus be considered together as a decision-making authority for determining a preferred reversionary action plan.

Thus, at step 21, the processor 8 determines whether implementation of one or more of the reversionary action plans is within the predetermined remit of a delegated autonomy for the processor 8, which remit may or may not change during the course of the mission. If one or more of the reversionary action plans is within such remit, the processor 8 autonomously determines a preferred one of the reversionary action plans in accordance with a predetermined selection algorithm and sends a suitable control signal to the control unit 12 for implementing the preferred reversionary action plan in accordance with the autonomous determination (indicated by the arrow 21a in FIG. 2). In this manner, a preferred reversionary action plan is implemented without the need to interrogate the pilot 10.

If none of the reversionary action plans can be implemented by the processor 8 within the remit of its delegated autonomy, the processor 8 issues a request to the pilot 10, at step 25, to determine a preferred one of the reversionary action plans for achieving a given mission objective. The pilot 10 then determines the preferred reversionary course of action at step 27 for achieving the current mission objective(s), which mission objective(s) may or may not change during the mission, and instructs the control unit 12 to implement the preferred reversionary action plan (indicated by the arrow 27a in FIG. 2).

Alternatively, the pilot 10 might authorise an appropriate expansion in the remit of delegated autonomy for the processor 8, so that at least one of the reversionary action plans is included within the remit of delegated autonomy for the processor 8. In this case, it is envisaged that the processor 8 will autonomously determine a preferred one of the reversionary action plans in accordance with the aforementioned selection algorithm, but in the context the expanded remit of delegated autonomy, and send a suitable control signal to the control unit 12 to implement the preferred plan.

It is envisaged that the vehicle system 4 might be divided into two or more independent subsystems that form part of the vehicle system 4 (in the sense that the vehicle system 4 is directly functionally dependent upon each of the subsystems, whereas the subsystems are not directly functionally dependent upon each other per se). One example of independent subsystems might be the separate engines in a twin-engine aircraft, which each form part of an overall power system for the aircraft but which are not directly functionally dependent upon each other.

The residual capability of the vehicle system will be dependent upon the residual capability of one or more of the subsystems and in general terms it is envisaged that where a fault is detected in a subsystem forming part of a "higher" vehicle system, the residual capability of the vehicle system may be determined as a function of the residual capability of the subsystem.

In this manner, it is envisaged that it will be possible to account for the relative criticality (importance) of the, or each, faulty subsystem to the vehicle system when "mapping" the residual capability of the subsystems onto the vehicle system following fault detection.

By way of example, the vehicle system 4 may comprise two subsystems, each of which has developed a fault. The first subsystem may have a residual capability defined by a level 3 severity rating (at the level of that first subsystem) and a timeframe of 200 minutes for transition to level 4 (imminent failure of the subsystem); similarly, the second subsystem may have a residual capability defined by a level 1 severity rating and a timeframe of 20 minutes for transition to level 3 and a further 30 minutes for transition to level 4. During step 18 of the decision-loop 14, the processor 8 will prognose the effect of the fault at the vehicle-system level essentially as before; however, if the second subsystem is determined to have a high criticality to the vehicle system 4, so that the fault may cause the vehicle system 4 to "fail" before the second subsystem itself actually fails, the level 1 severity level and 50 minute time-frame to reach level 4 for that second subsystem may for example be translated into a level 2 severity for the particular vehicle system 4 as a whole, with a transition time to a threshold severity of only 20 minutes (ie the time taken for the second subsystem to reach level 3 severity).

Determining the residual capability of the vehicle system in terms of the residual capability of two or more subsystems may be particularly advantageous where the vehicle system incorporates "compensatory" groups of independent sub-systems, that is a group of sub-systems wherein one or more subsystems potentially mitigate the effect of a fault developed in one or more other sub-systems. The aforementioned engines in a twin-engine aircraft are an example of a "compensatory" pair of sub-systems. Thus, where only one of the engines developed a fault, the other engine would effectively compensate the effects of that fault by nevertheless continuing to provide thrust on demand, albeit at a reduced overall level. The residual capability of the power system as a whole would be dependent upon the residual capability of both of the engines, and the effect of a fault developed in one engine would potentially be mitigated by the presence of the other engine.

Figure 3:
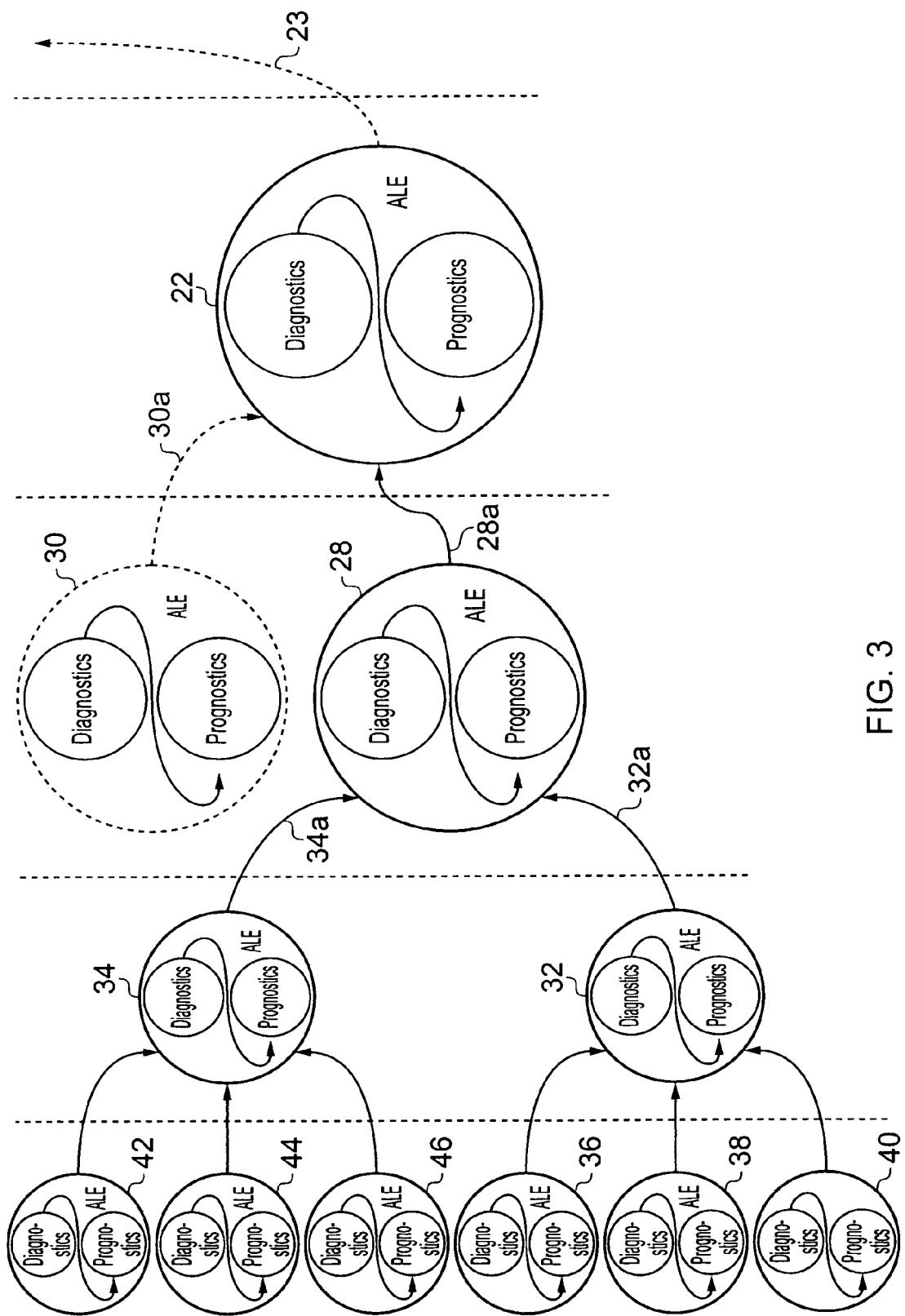
FIG. 3 is a highly schematic illustration of the various systems and subsystems in a twin-engine aircraft.

The situation is illustrated in FIG. 3, which shows in highly schematic terms a twin-engine power system 22 comprising a first engine subsystem 28 and a second engine subsystem 30. In order to generate suitable reversionary action plans 23 in the case where one of the engines 28, 30 develops a fault, the residual capability of the power system 22 is determined as a function of the residual capability 28a of the engine 28 and the residual capability 30a of the engine 30.

It will be appreciated that any given subsystem may itself effectively be considered to be a system incorporating one or more compensatory pairs or groups of subsystems and, where this is the case, it is envisaged that the residual capability of the subsystem would again be determined as a function of the residual capability of each "lower" relevant subsystem.

Thus, referring back to FIG. 3, the engine 28 may comprise a combustion subsystem 32 and a fan-bypass subsystem 34 and where the fault has occurred in one of these subsystems 32, 34 the residual capability 28a may be determined as a function of the residual capability 32a of the combustion subsystem 32 and the residual capability 34a of the fan-bypass subsystem 34, with the transfer function being predetermined to take account of the mutually compensatory effects of the fan-bypass subsystem 34 and core combustion subsystem 32 on the available thrust.

Still referring to FIG. 3, the residual capability 32a may likewise be determined on the basis of the separate residual capabilities of compensatory fuel injectors 36, 38, 40, where a fault is detected in one or more of the fuel injectors 36, 38, 40. Similarly, the fan-bypass system 34 might incorporate mutually compensatory fan blades 42, 44, 46 and where the fault has occurred in one of these blades 42, 44, 46 the residual capability 34a may be determined on the basis of the residual capabilities of the compensatory blades 42, 44, 46.

In this manner, it is envisaged that the compensatory effects of each compensatory group of subsystems can advantageously be accounted for in the prognosis at step 18 of the decision-making loop 14 (FIG. 2).

The particular "transfer function (s)" and any associated "transfer data" required for mapping the residual capability of the or each relevant subsystem into a residual capability for the "higher" vehicle system may be predetermined, on the basis of test data where appropriate, taking into account for example relative criticalities of the subsystems to the vehicle system and, where appropriate, the compensatory effects of any groups of compensatory subsystems. The transfer function and transfer data may be stored on-board in a memory for retrieval by the processor 8.

Figure 4:
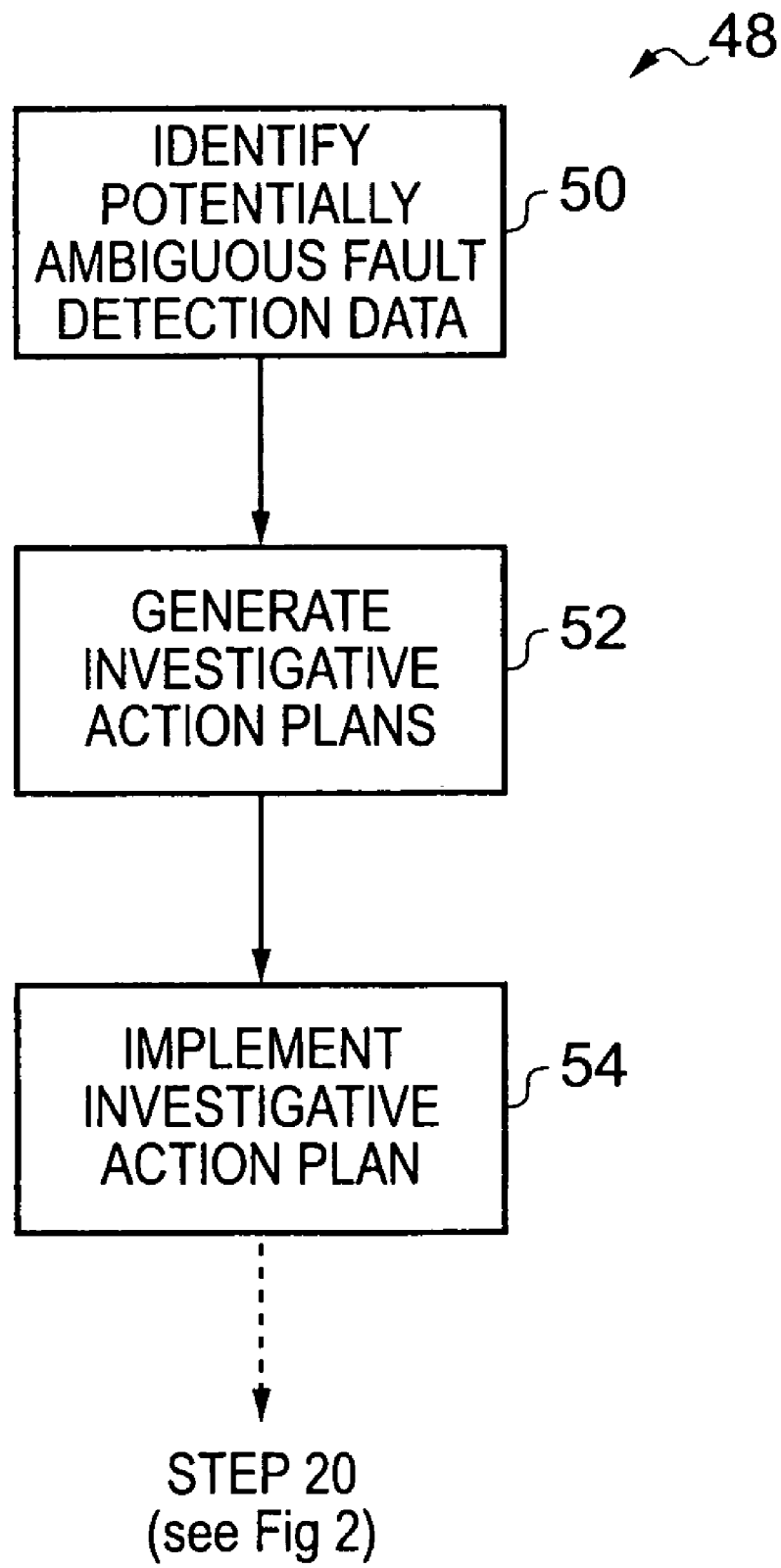
FIG. 4 is a flow diagram showing a fault identification loop.

In order to distinguish between faults that may have similar symptoms, the processor 8 may implement a fault detection loop 48, shown in FIG. 4, as part of the decision making loop 14, preferably prior to carrying out the prognosis at step 18.

Referring to FIG. 4, the fault detection loop 48 comprises the identification of any potentially ambiguous fault detection at step 50, generating one or more investigative action plans for identifying the fault at step 52, and then implementing a preferred one of the investigative action plans at 54 in order to try and unambiguously identify the fault.

Identifying a potentially ambiguous fault detection may be achieved using a predetermined "look-up" table of ambiguous symptoms stored in an associated memory for retrieval by the processor 8.

The investigative action plans may generally comprise adjusting an investigative parameter associated with the respective vehicle system 4, for example vehicle thrust in the case of a power system.

Determination of a preferred investigative action plan may be carried out autonomously by the processor 8 or alternatively by the decision-making authority 10, in similar manner to the determination of a preferred reversionary action plan described above.

Following step 54, the processor may then proceed to step 18 in the decision-making loop 14 if the ambiguity is sufficiently resolved, or may choose to pursue further investigation (see FIG. 2).

It is envisaged that in one embodiment, following initial fault detection and completion of the decision making loop 14 to implement a preferred reversionary action plan, the processor 8 will automatically instigate the decision making loop 14 at predetermined intervals thereafter to effectively monitor the vehicle system 4 throughout the remainder of the mission. In this manner, a given preferred reversionary action plan may be superseded at said predetermined intervals by successive preferred reversionary action plans, taking into account for example changes in fault detection, fault identification, residual capability and mission objectives over time.

Although the described embodiments relate to a vehicle system, other types of system are envisaged. For example, the system 4 may be a system in an industrial plant such as a chemical plant, and the pilot 10 may then be a suitable controller of the plant, being either a human controller or an automated controller. The operating period for the system may be a predetermined operating cycle for the system until maintenance is scheduled to take place. Alternatively, the operating period may be the period during which it would be inconvenient or dangerous to interrupt the operating cycle. In either case, mitigating the system-level effect of the fault during the operating period may allow operation of the system to continue (for example at a lower operating speed or efficiency) until the end of the operating period, whereafter the cycle may be safely interrupted or maintenance carried out in accordance with the predetermined schedule.

The invention claimed is:

1. A method of mitigating a system-level effect of a fault detected in a system during an operating period, the method comprising:

using a controller to automatically prognose the system-level effect of said fault in terms of a residual capability of the system during a remainder of the operating period based on predetermined stored data;

using the controller to automatically generate a corresponding set of alternative reversionary action plans for mitigating said system-level effect during the remainder of the operating period based on said prognosis, wherein each reversionary action plan includes a first projected outcome if a current setting for a mitigation parameter is not adjusted, a proposed adjustment to the current setting for the mitigation parameter and a time frame for reaching the first projected outcome;

submitting the set of alternative reversionary action plans to a decision-making authority for determination by the decision-making authority of a preferred one of the reversionary action plans suitable for achieving an objective; and using the controller, operably connected to the system, to implement a preferred reversionary action plan in accordance with said determination.

2. A method according to claim 1, wherein the decision-making authority comprises the controller having a predetermined remit of delegated autonomy for determining the preferred reversionary action plan.

3. A method according to claim 1, wherein the system comprises one or more subsystems and the system level-effect of the fault is determined as a function of a residual capability of the one or more subsystems.

4. A method according to claim 3, wherein the system encompasses one or more compensatory groups of subsystems and the system-level effect of the fault is determined as a function of a residual capability for each subsystem in said one or more compensatory groups of subsystems.

5. A method according to claim 1, wherein prognosis of the residual capability of the system or subsystem includes determining a time scale for a severity of the fault to escalate to a threshold severity for that system or subsystem respectively.

6. A method according to claim 5, wherein the prognosis further includes estimating a confidence in the determined time scale.

7. A method according to claim 1, wherein a number of the alternative reversionary action plans generated is a function of a differential system-level severity with respect to one or more mitigation parameters.

8. A method according to claim 1, wherein said automatic prognosis of the system-level effect of said fault comprises implementing a fault detection analysis loop for resolving identification of the fault.

9. A method according to claim 1, wherein the system is a vehicle system, the operating period is a vehicle mission and the objective is a mission objective.

10. A method according to claim 9, wherein the decision-making authority comprises a pilot of the vehicle.

11. A method according to claim 10, wherein the pilot is an autopilot.

12. A method according to claim 9, wherein the vehicle is an aircraft.

13. A control-system configured for carrying out the method according to claim 1.

14. A method according to claim 1, wherein each reversionary action plan further includes a current system-level criticality, a second projected outcome if the current setting for the mitigation parameter is adjusted as proposed and a time frame for reaching the second projected outcome.

* * * * *